(12) United States Patent
Peterson

(10) Patent No.: US 9,232,701 B1
(45) Date of Patent: Jan. 12, 2016

(54) FOUR ROLLER TREE HARVESTER HEAD

(71) Applicant: Robin A. Peterson, Port Orange, FL (US)

(72) Inventor: Robin A. Peterson, Port Orange, FL (US)

(*) Notice: Subject to any disclaimer, the term of this patent is extended or adjusted under 35 U.S.C. 154(b) by 254 days.

(21) Appl. No.: 13/952,164

(22) Filed: Jul. 26, 2013

Related U.S. Application Data

(63) Continuation-in-part of application No. 13/633,257, filed on Oct. 2, 2012, now abandoned.

(51) Int. Cl.
*A01G 23/083* (2006.01)

(52) U.S. Cl.
CPC .................................. *A01G 23/083* (2013.01)

(58) Field of Classification Search
CPC ... A01G 23/08; A01G 23/081; A01G 23/083; A01G 23/085; A01G 23/087; A01G 23/091; A01G 23/093; A01G 23/095; A01G 23/097
See application file for complete search history.

(56) References Cited

U.S. PATENT DOCUMENTS

| | | | |
|---|---|---|---|
| 4,898,218 A | | 2/1990 | Linderholm |
| 5,908,060 A | * | 6/1999 | Fargeot ......................... 144/4.1 |
| 5,931,247 A | | 8/1999 | Peterson |
| 5,957,177 A | * | 9/1999 | Smith et al. ................ 144/248.7 |

* cited by examiner

*Primary Examiner* — Matthew G Katcoff
(74) *Attorney, Agent, or Firm* — Donald J. Ersler

(57) ABSTRACT

An improved four roller tree harvester head preferably includes a tower frame, a saw box, a delimb box, a four roller assembly, a slewing ring and a boom bracket. The saw box is mounted to a bottom of the tower frame and the delimb box is mounted to a top of the tower frame. Hydraulic hoses and electrical lines are routed through the boom bracket, slewing ring and tower frame to a hydraulic valve block. Hydraulic hoses may be attached to a rotary union. An actuation cylinder of the four roller assembly includes a linear positioning sensor, which provides an output to an electronic controller, which calculates a diameter of a tree. The four roller assembly includes at least one rotation encoder, which provides an output to the electronic controller about the length of a tree. An independent measurement wheel measures a length of the tree through the electronic controller.

18 Claims, 19 Drawing Sheets

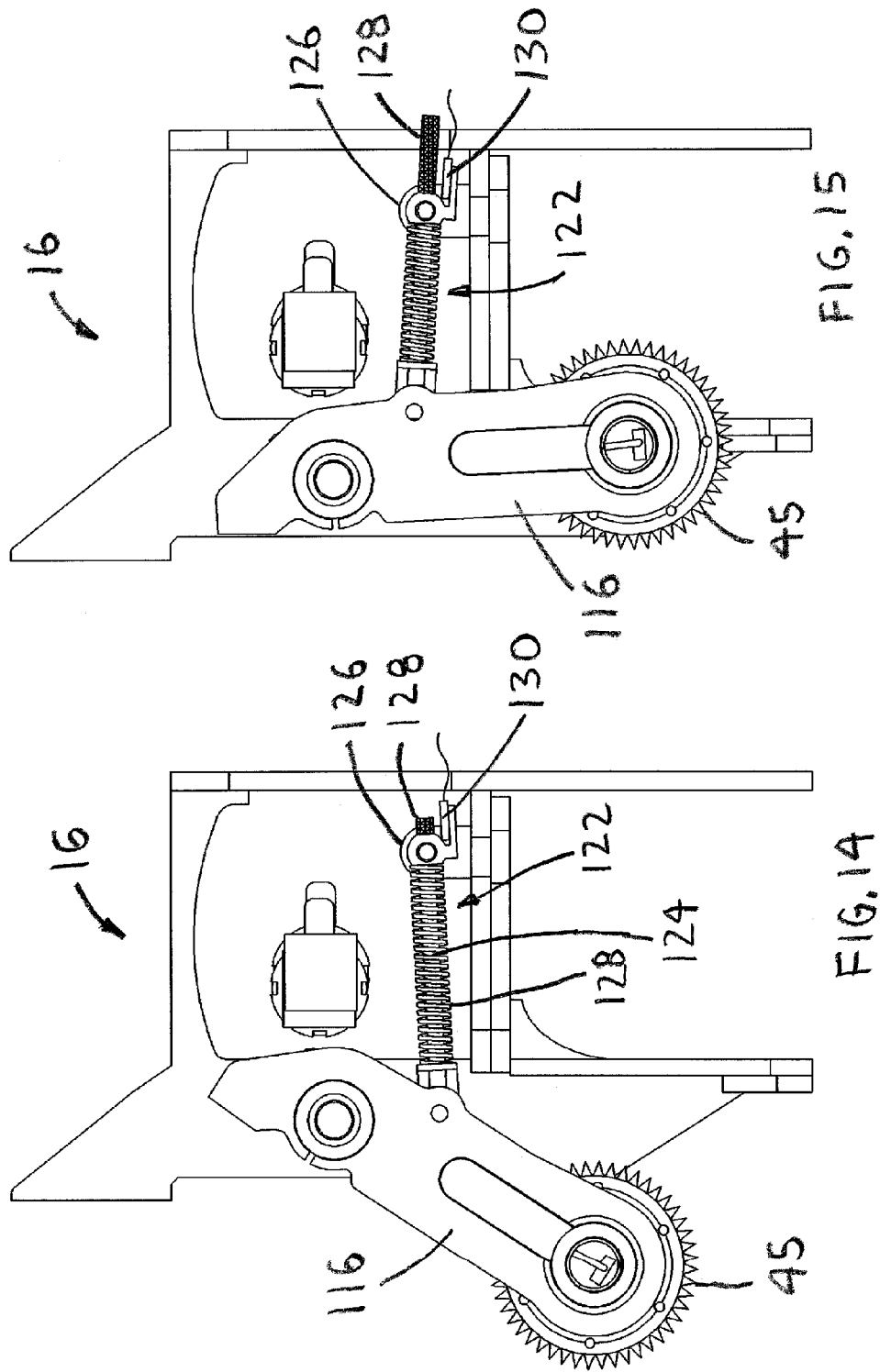

FOUR ROLLER TREE HARVESTER HEAD

CROSS-REFERENCES TO RELATED APPLICATIONS

This is a continuation-in-part application, which claims the benefit of nonprovisional patent application Ser. No. 13/633,257 filed on Oct. 2, 2012.

BACKGROUND OF THE INVENTION

1. Field of the Invention

The present invention relates generally to tree harvesting and more specifically to an improved four roller tree harvester head, which enables more accurate and reliable length and diameter of a tree to be measured during processing.

2. Discussion of the Prior Art

U.S. Pat. No. 5,931,247 to Peterson discloses a forest harvester methods and apparatus. However, the Peterson patent does not enable a length and diameter of a tree to be measured by methods contained here with-in. Further, the Peterson patent routes hydraulic and electrical lines to a side of the tree harvester, where the lines are subject to damage during use. U.S. Pat. No. 4,898,218 to Linderholm discloses a delimbing device for a tree.

Accordingly, there is a clearly felt need in the art for an improved four roller tree harvester head, which allows a length and diameter of a tree to be precisely measured and which routes hydraulic and electrical lines through an opening in a slewing ring to avoid damage during use.

SUMMARY OF THE INVENTION

The present invention provides an improved four roller tree harvester head, which routes hydraulic and electrical lines through a slewing ring to avoid damage during use. The improved four roller tree harvester head preferably includes a tower frame, a saw box, a delimb head box, head mounted hydraulic control valves, a four roller assembly, a slewing ring, a boom bracket and an electronic controller. The saw box is mounted to a bottom of the tower frame and the delimb head box is mounted to a top of the tower frame. The four roller assembly is retained on a front of the tower frame. The slewing ring includes an inner ring and an outer ring. The outer ring is attached to a rear of the tower frame. The inner ring is attached to the boom bracket. A tower hose opening is formed through the tower frame for alignment with an inner diameter of the inner ring. The outer ring is driven by at least one or two slewing ring drive motors. The at least one or two slewing ring motors are preferably retained on the boom bracket. The boom bracket is sized to receive and retain the end of a tree harvester boom. The boom bracket includes a boom base plate and two boom plates extending outward from the boom base plate. A boom hose opening is formed through the boom base plate for alignment with the inner diameter of the inner ring.

Hydraulic hoses and electrical lines are routed through the inner diameter of the inner ring of the slewing ring, the tower hose opening and the boom hose opening. A hydraulic rotary union may be mounted to the boom base plate to protect the hydraulic hoses from damage. An electrical slip ring may be used in conjunction with a hydraulic rotary union having a wire bore. The delimb head box includes a delimb base plate, a pair of delimb pivot plates, a pair of delimb arms and a delimb cylinder. The pair of delimb arms are pivotally retained between the pair of delimb base plates. The delimb cylinder opens and closes the delimb arms. An independent measurement wheel is rotatably retained on one end of a pivot arm. The other end of the pivot arm is pivotally retained on the delimb box. Rotation of the independent measurement wheel by the travel of a tree provides a measurement of a length of the tree being processed.

The four roller assembly preferably includes four rollers, a pair of walking beams, a pair of swing arms, a pair of motors and an roller actuation cylinder. One end of each of the pair of swing arms is pivotally engaged with an end of the roller actuation cylinder. The swing arms are also pivotally retained by the tower frame. The other end of the pair of swing arms are pivotally engaged with the pair of walking beams. Two rollers are retained on each end of the walking beam. The roller actuation cylinder preferably includes a linear positioning sensor. The linear positioning sensor provides an electrical signal about how far the rod of the roller cylinder has actuated. The electrical signal is feed to the electronic controller, which includes a software program that calculates a diameter of the tree being harvested from the electrical signal. A drive roller on each walking beam is attached to and driven by a motor. A slave roller is mechanically driven through a chain drive or other device by the drive roller. The slave roller is rotatably retained on a roller shaft. A magnet shaft is rotatably retained in a center of the roller shaft. The magnet is attached to a hub of the roller shaft. A rotation encoder is also retained in the roller shaft. The rotation encoder is preferably a non-contact shaftless rotation encoder. Rotation of the magnet provides a magnetic output to the rotation encoder of how many rotations or what fraction of a rotation of the slave roller has been made. The rotation encoder provides an electrical signal to the electronic controller. The electronic controller includes a software program that translates the rotation of the second slave roller to determine a length of the tree section being harvested.

Accordingly, it is an object of the present invention to provide an improved four roller tree harvester head, which allows a more reliable and more accurate length of tree section to be measured.

It is a further object of the present invention to provide an improved four roller tree harvester head, which allows a positive reliable diameter of a tree to be measured.

It is another object of the present invention to provide an improved four roller tree harvester head, which includes an independent measurement wheel to measure a length of a tree.

It is yet a further object of the present invention to provide an improved four roller tree harvester head, which routes fewer hydraulic and electrical lines through an opening in a slewing ring to avoid damage during use.

Finally, it is another object of the present invention to provide an improved four roller tree harvester head, which locates hydraulic control valves that operate the harvesting head functions on the harvesting head, which results in the reduction of the number of hydraulic hoses feeding harvester head functions.

These and additional objects, advantages, features and benefits of the present invention will become apparent from the following specification.

BRIEF DESCRIPTION OF THE DRAWINGS

FIG. 14 is a side view of a pivot arm pivotally retained on the delimb box of at one end of its operating range of an improved four roller tree harvester head in accordance with the present invention.

FIG. 15 is a side view of a pivot arm pivotally retained on the delimb box of at the other end of its operating range of an improved four roller tree harvester head in accordance with the present invention.

DETAILED DESCRIPTION OF THE PREFERRED EMBODIMENTS

Figure 1:
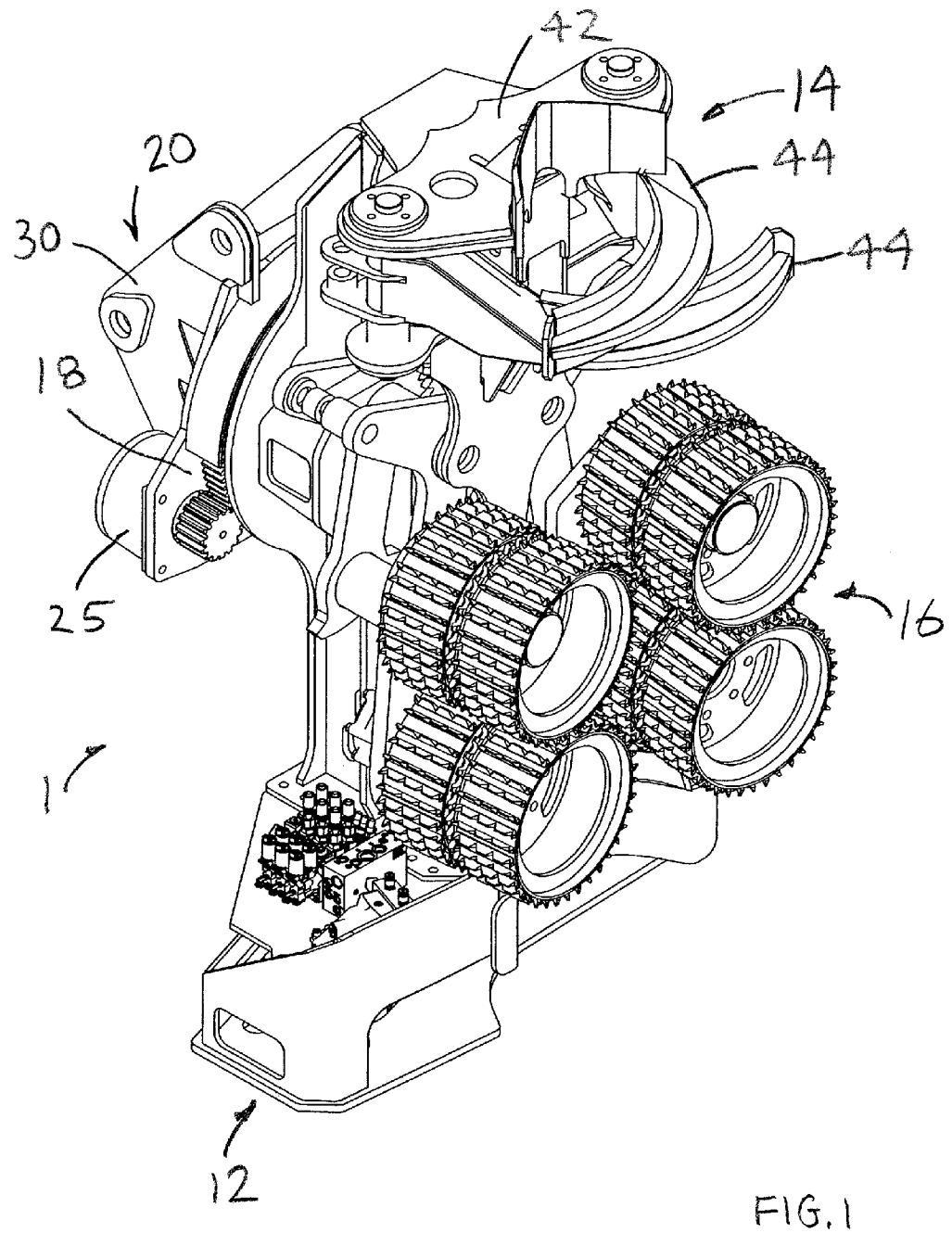
FIG. 1 is a front perspective view of an improved four roller tree harvester head in accordance with the present invention.
Figure 1A:
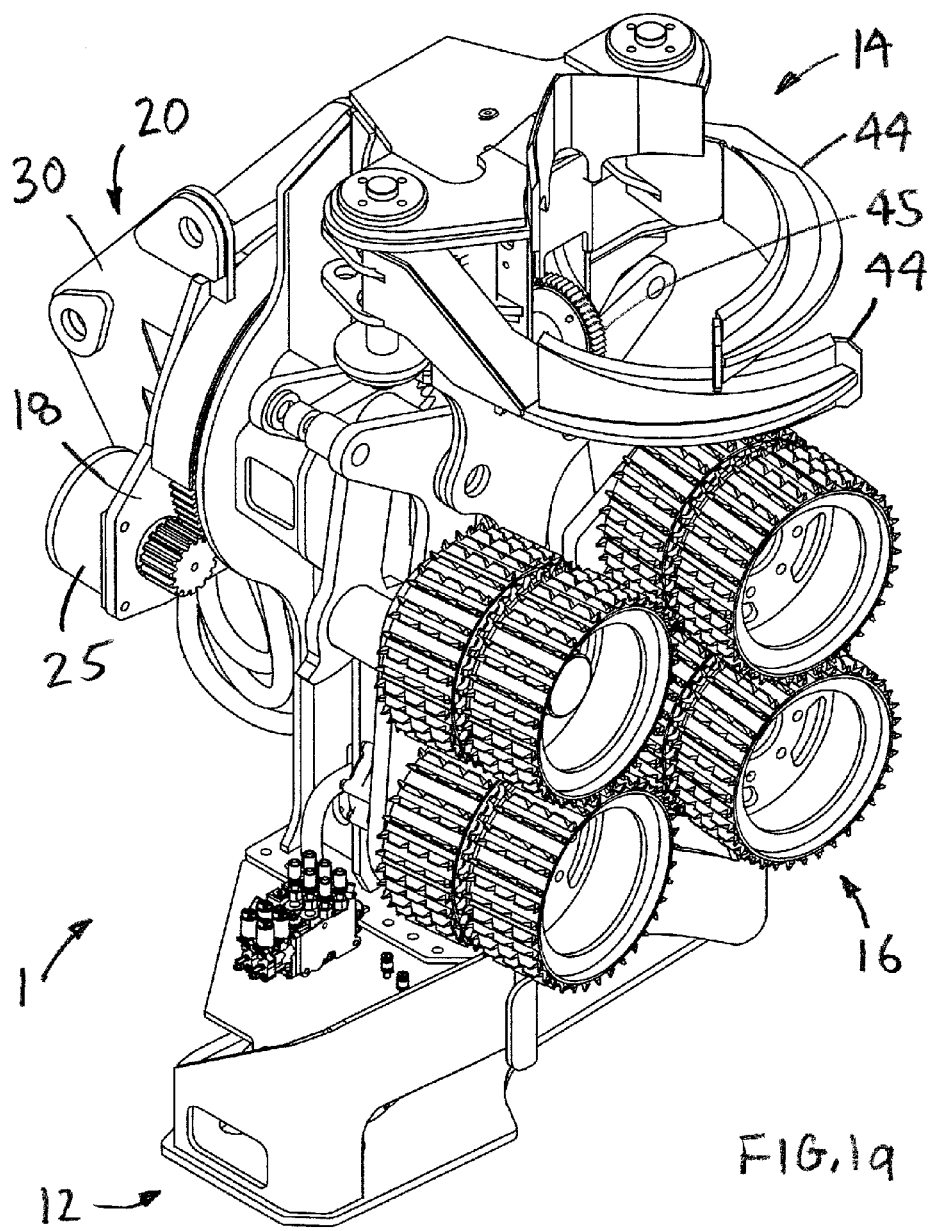
FIG. 1a is a front perspective view of an improved four roller tree harvester head with an independent measurement wheel in accordance with the present invention.
Figure 2:
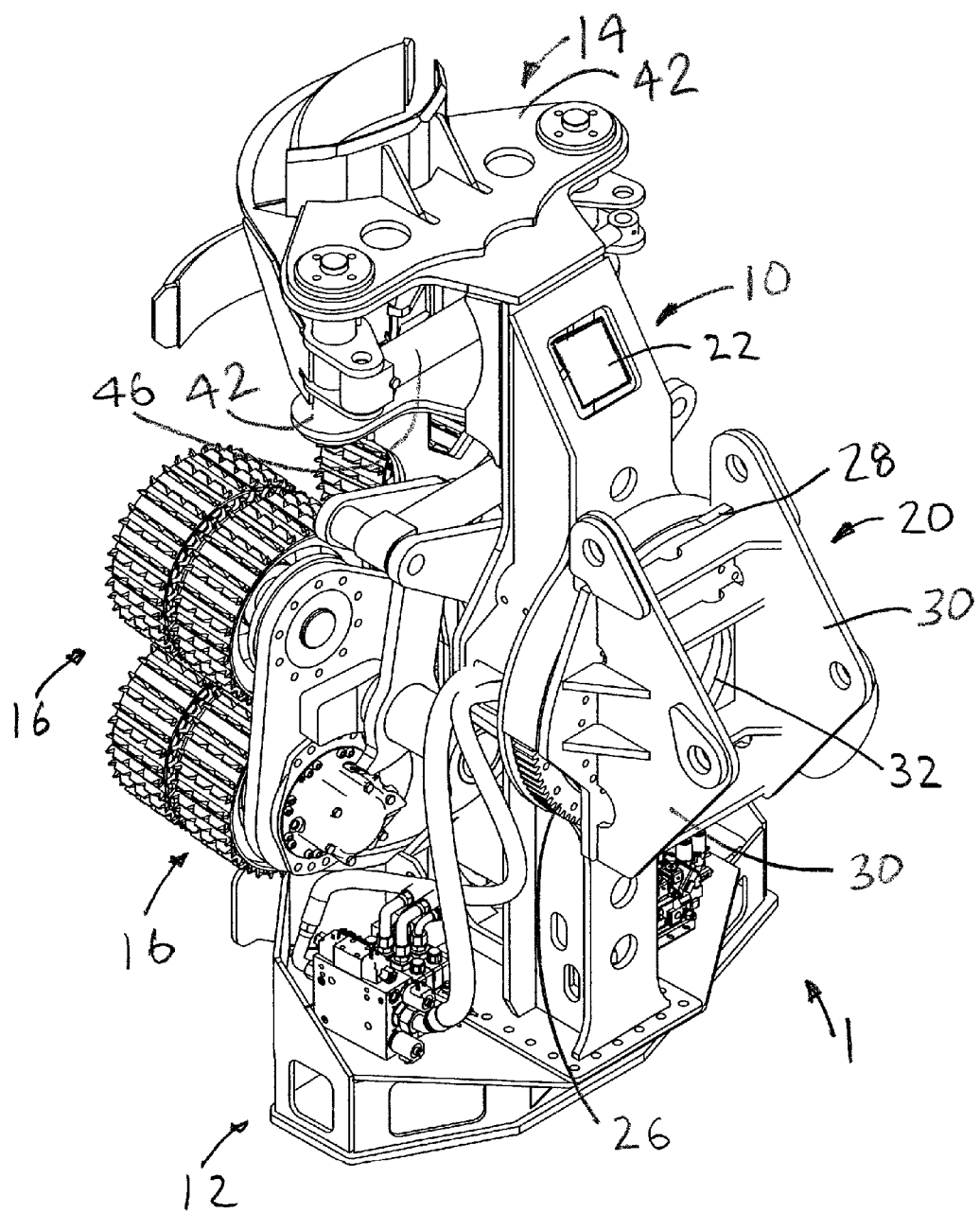
FIG. 2 is a rear perspective view of an improved four roller tree harvester head in accordance with the present invention.
Figure 3:
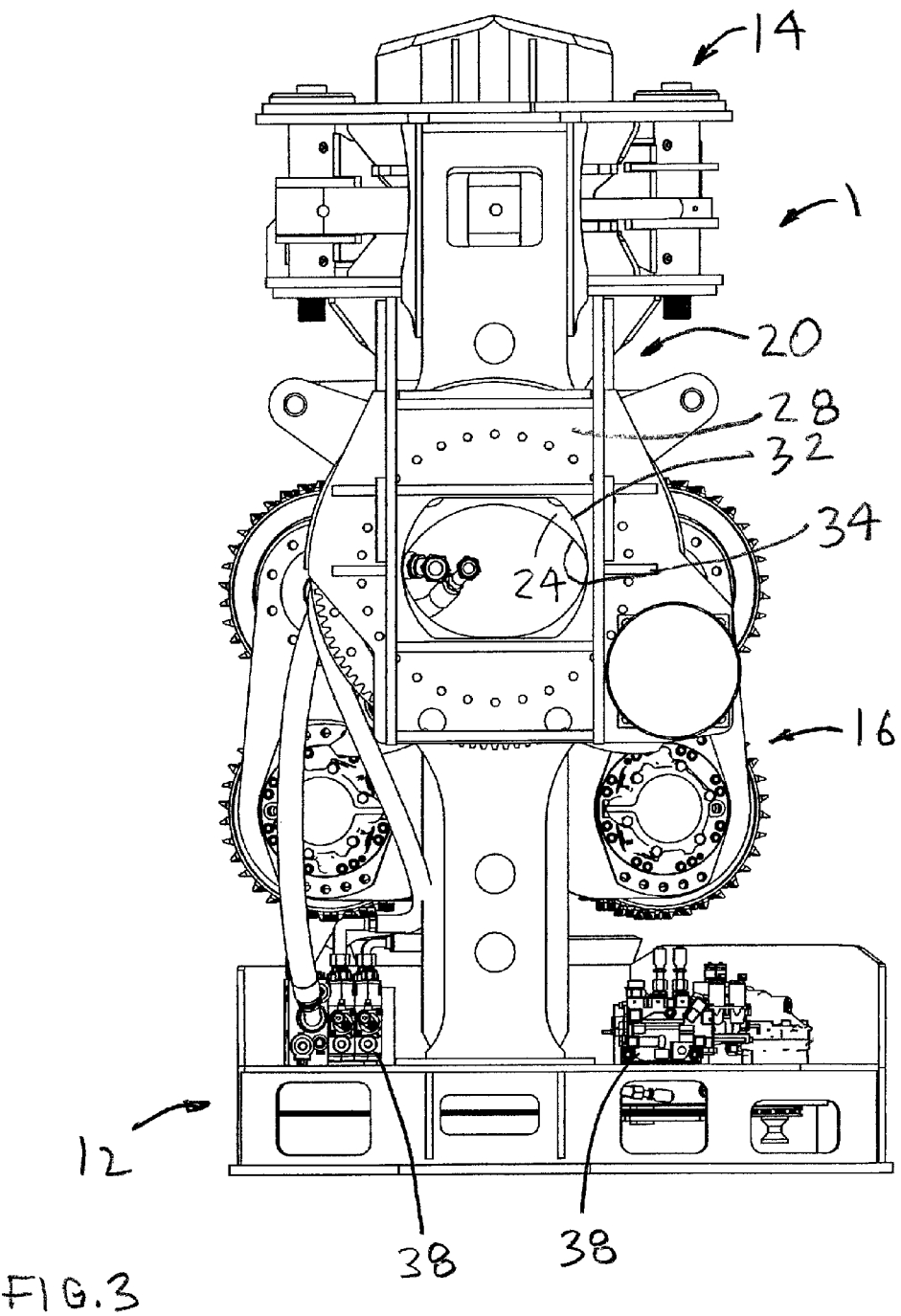
FIG. 3 is a rear view of an improved four roller tree harvester head in accordance with the present invention.
Figure 4:
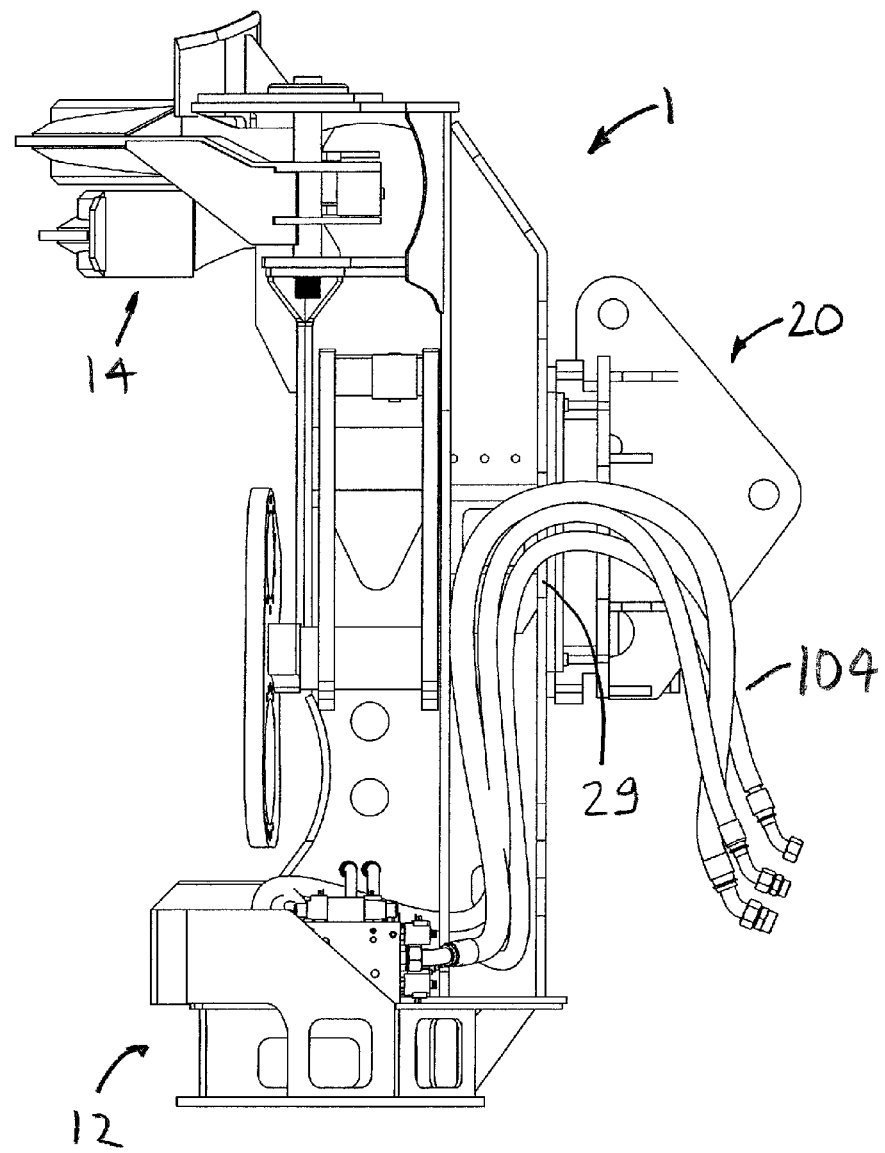
FIG. 4 is a cross sectional side view of an improved four roller tree harvester head illustrating hydraulic hoses passing through a boom base plate, a slewing ring and a tower frame in accordance with the present invention.
Figure 8:
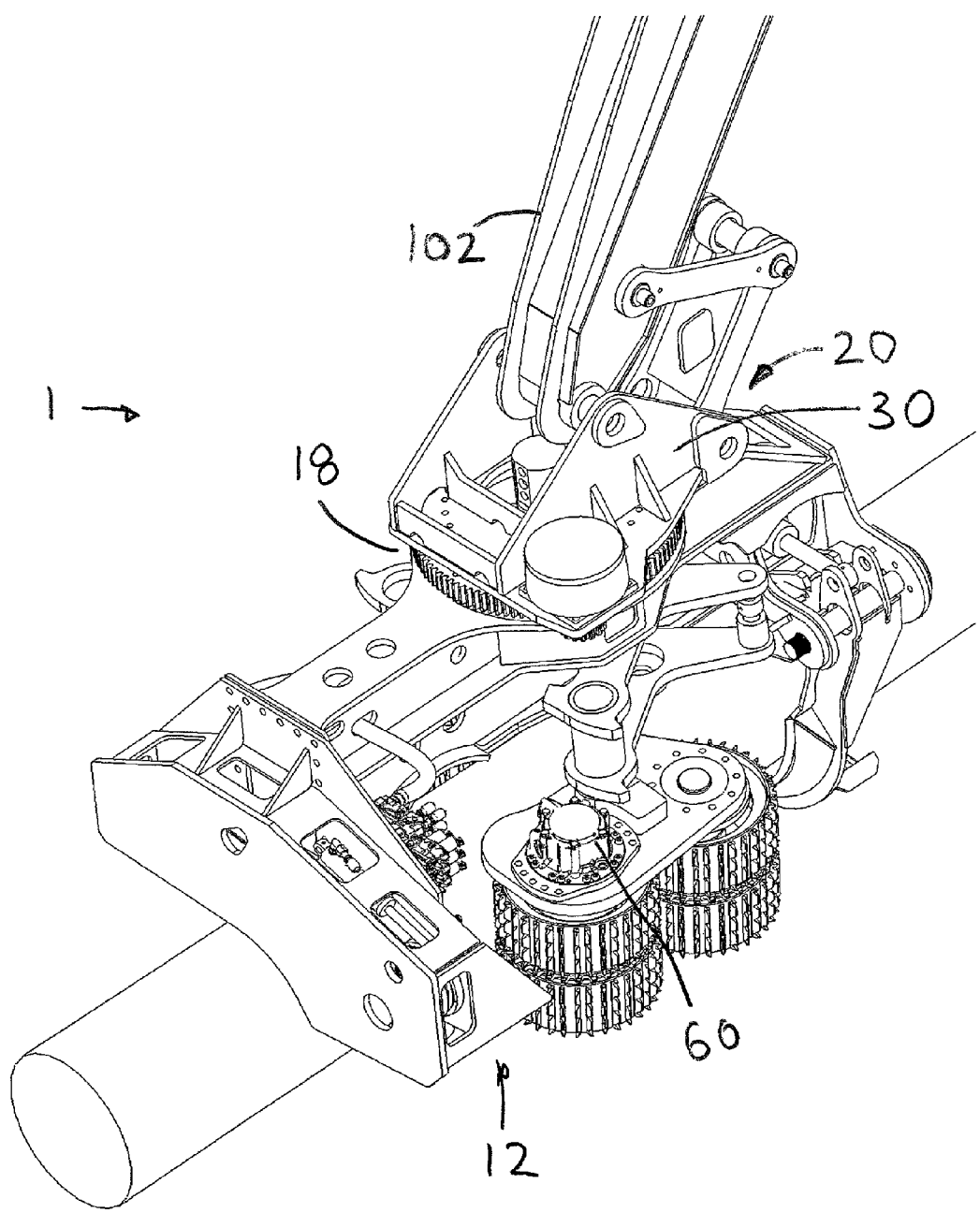
FIG. 8 is a perspective view of an improved four roller tree harvester head with a tree retained in a pair of delimb arms and a harvester boom retained by a boom bracket in accordance with the present invention.

With reference now to the drawings, and particularly to FIG. 1, there is shown a front perspective view of an improved four roller tree harvester head 1. With reference to FIGS. 2-8, the improved four roller tree harvester head 1 preferably includes a tower frame 10, a saw box 12, a delimb head box 14, a four roller assembly 16, a slewing ring 18, a boom bracket 20 and an electronic controller 22. The saw box 12 is mounted to a bottom of the tower frame 10 and the delimb head box 14 is mounted to a top of the tower frame 10. An automated chain saw (not shown) is retained in the saw box 12 for cutting off a length of trees 100, 101. The four roller assembly 16 is retained on a front of the tower frame 10. The slewing ring 18 includes an inner ring 24 and an outer ring 26. The boom bracket 20 includes a boom base plate 28 and a pair of boom pivot plates 30, which extend outward from the boom base plate 28. The outer ring 26 is attached to a rear of the tower frame 10. The inner ring 24 is attached to the boom base plate 28. The outer ring 26 is driven by at least one or two slewing ring motors 25. The at least one or two slewing ring drive motors 25 are preferably attached to the boom bracket 20. A boom hose opening 32 is formed through the boom base plate 28 and a tower hose opening 29 is formed through the tower frame 10 both aligned with an inner diameter 34 of the inner ring 24. With reference to FIG. 8, the boom bracket 20 is sized to receive and retain the end of a tree harvester carrier boom 102.

Figure 5:
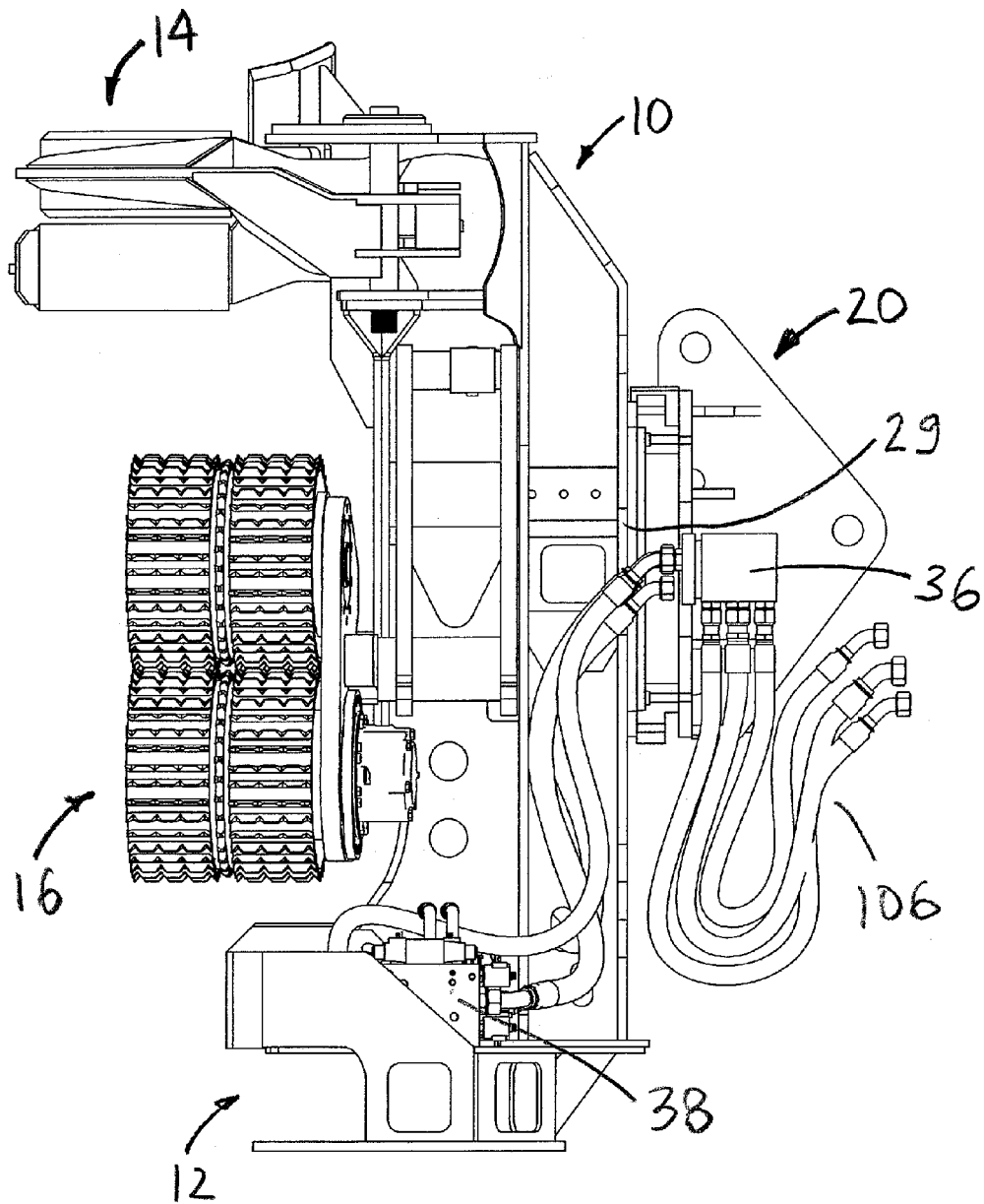
FIG. 5 is a cross sectional side view of an improved four roller tree harvester head with hydraulic hoses connected to a hydraulic rotary union in accordance with the present invention.
Figure 5Q:
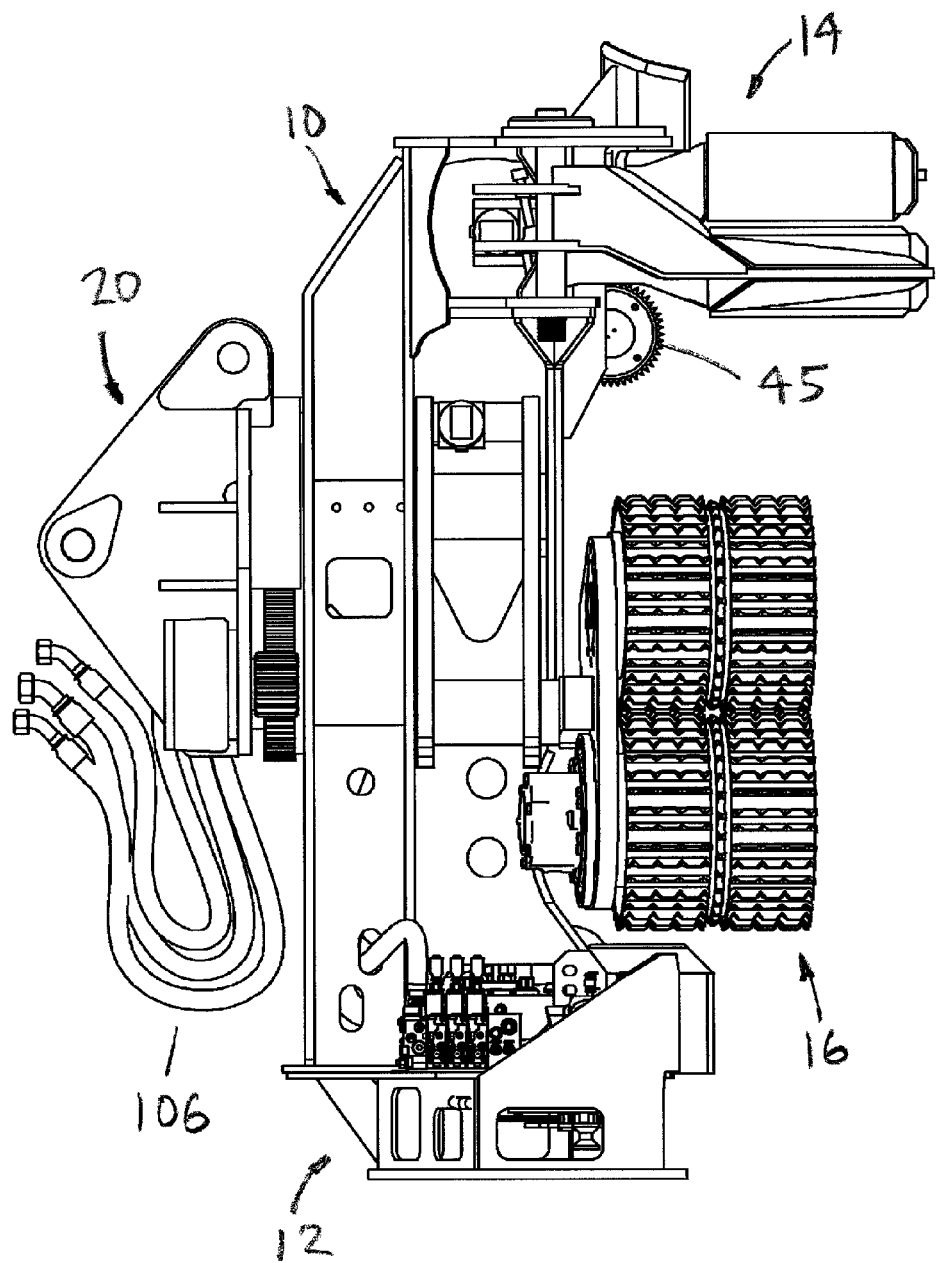
FIG. 5a is a side view of an improved four roller tree harvester head with an independent measurement wheel in accordance with the present invention.
FIG. 5c is a side view of an improved four roller tree harvester head with a hydraulic rotary union having a wire bore to allow an electrical slip ring to run electrical lines through the wire bore in accordance with the present invention.
FIG. 5d is an enlarged cross sectional side view of a slip ring attached to a hydraulic rotary union having a wire bore to allow wires from an electrical slip ring to run through the wire bore in accordance with the present invention.
Figure 5B:
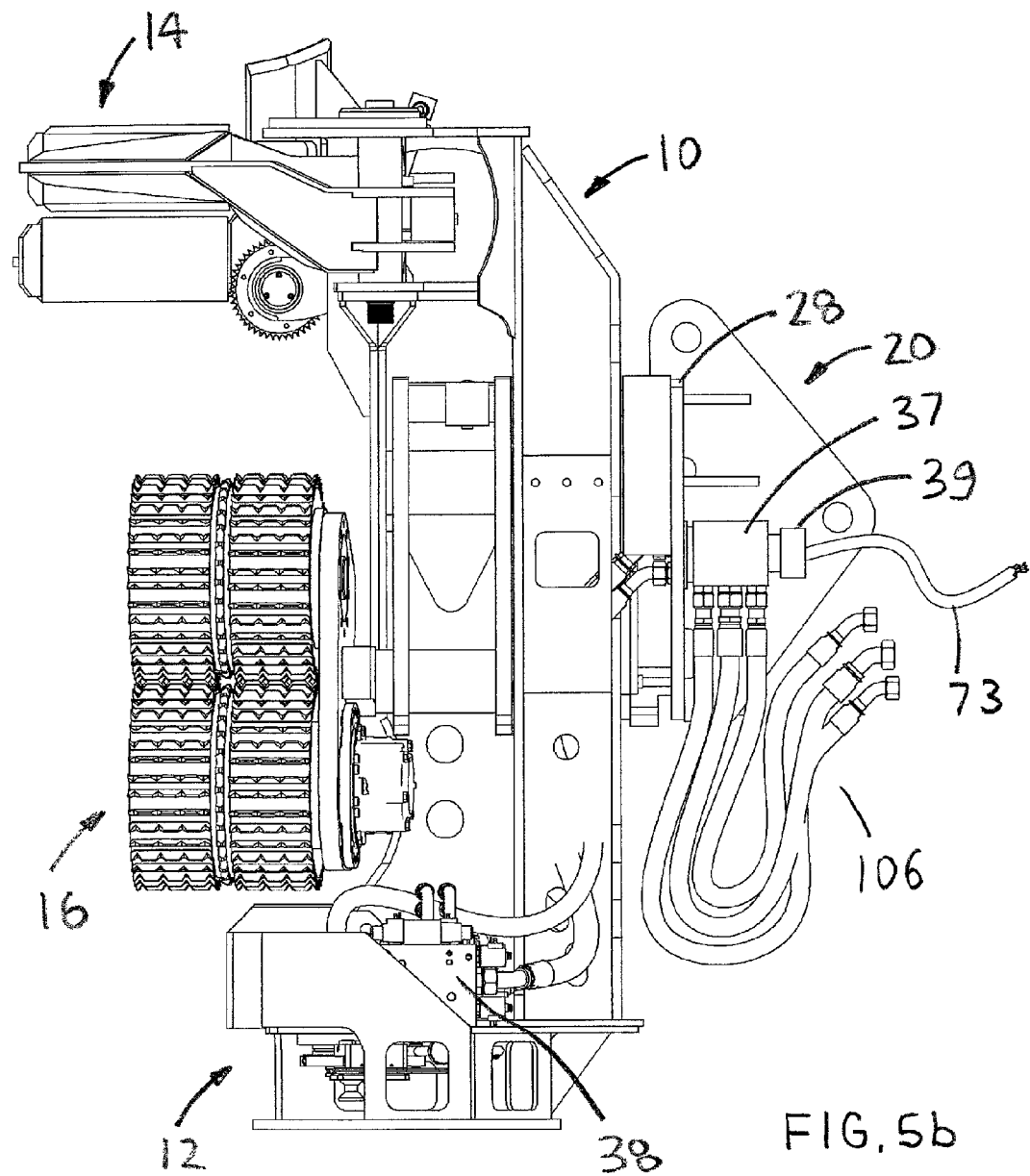

Hydraulic hoses 104 and electrical lines are routed through the inner diameter 34 of the inner ring 24, the tower hose opening 29 and the boom hose opening 32. With reference to FIG. 5, a hydraulic rotary union 36 may be mounted to the boom base plate 28 to protect the hydraulic hoses 106 from damage. The hydraulic rotary union 36 accommodates multiple hydraulic hoses 106. The hydraulic hoses 104 or hydraulic hoses 106 supply hydraulic fluid to and from hydraulic valve blocks 38. The electronic controller 22 operates a plurality of valves in the hydraulic valve blocks 38. The delimb head box 14 includes a pair of delimb pivot plates 42, a pair of delimb arms 44 and a delimb cylinder 46. The pair of delimb pivot plates 42 are attached to a front of the tower frame 10. The pair of delimb arms 44 are pivotally retained between the pair of delimb pivot plates 42. The delimb cylinder 46 opens and closes the pair of delimb arms 44. The delimb arms 44 radially retain trees 100, 101.

Figure 5C:
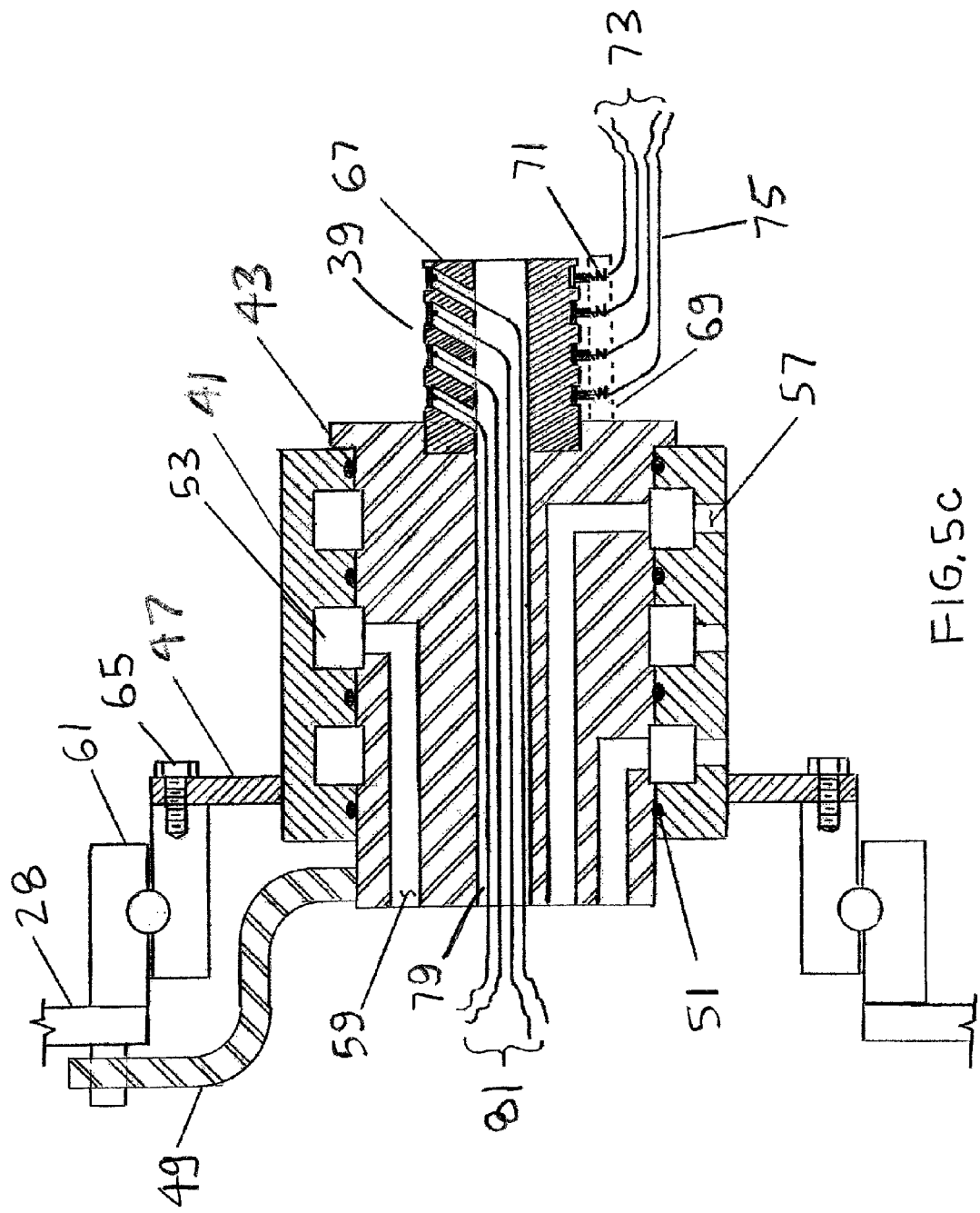
Figure 6:
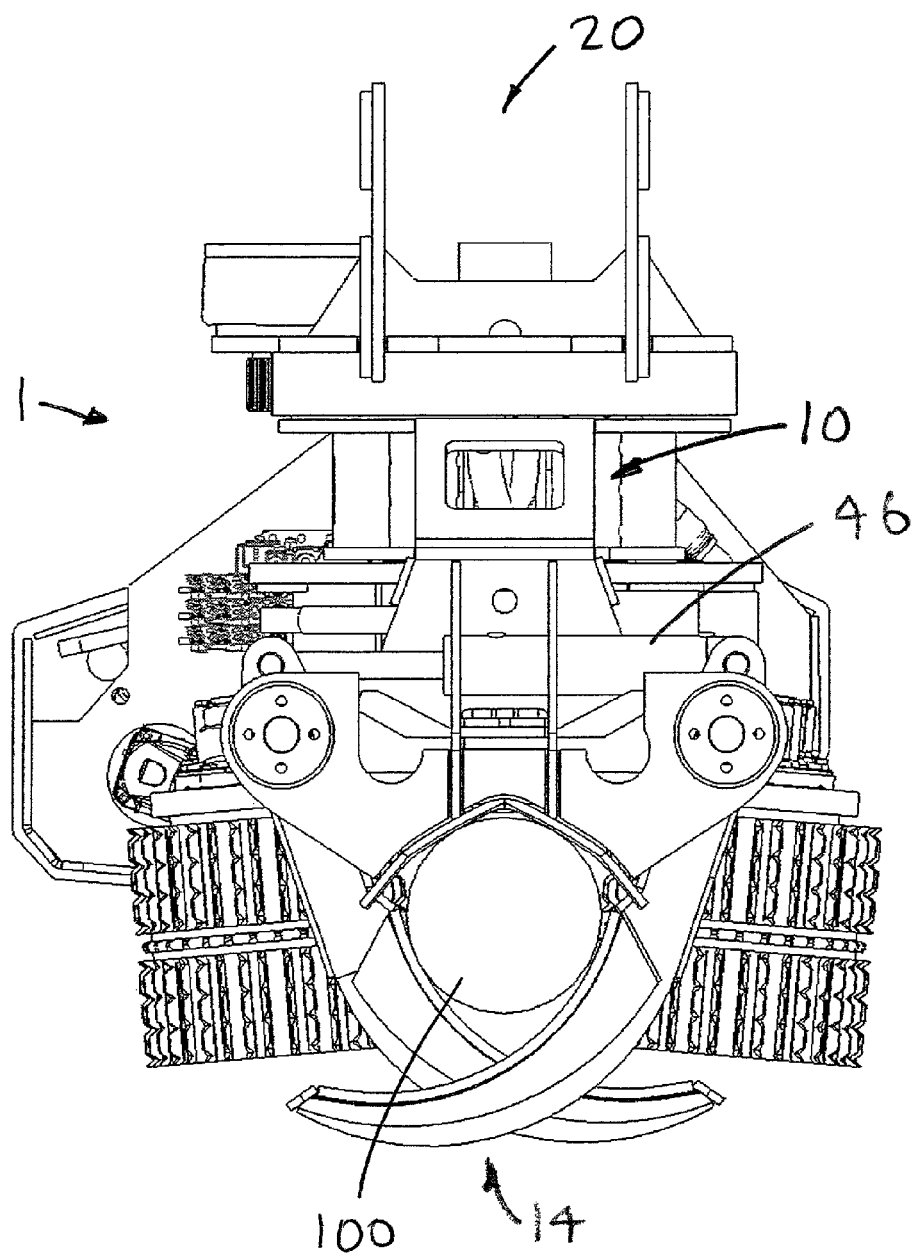
FIG. 6 is a top view of an improved four roller tree harvester head with a tree retained in a pair of delimb arms in accordance with the present invention.
Figure 7:
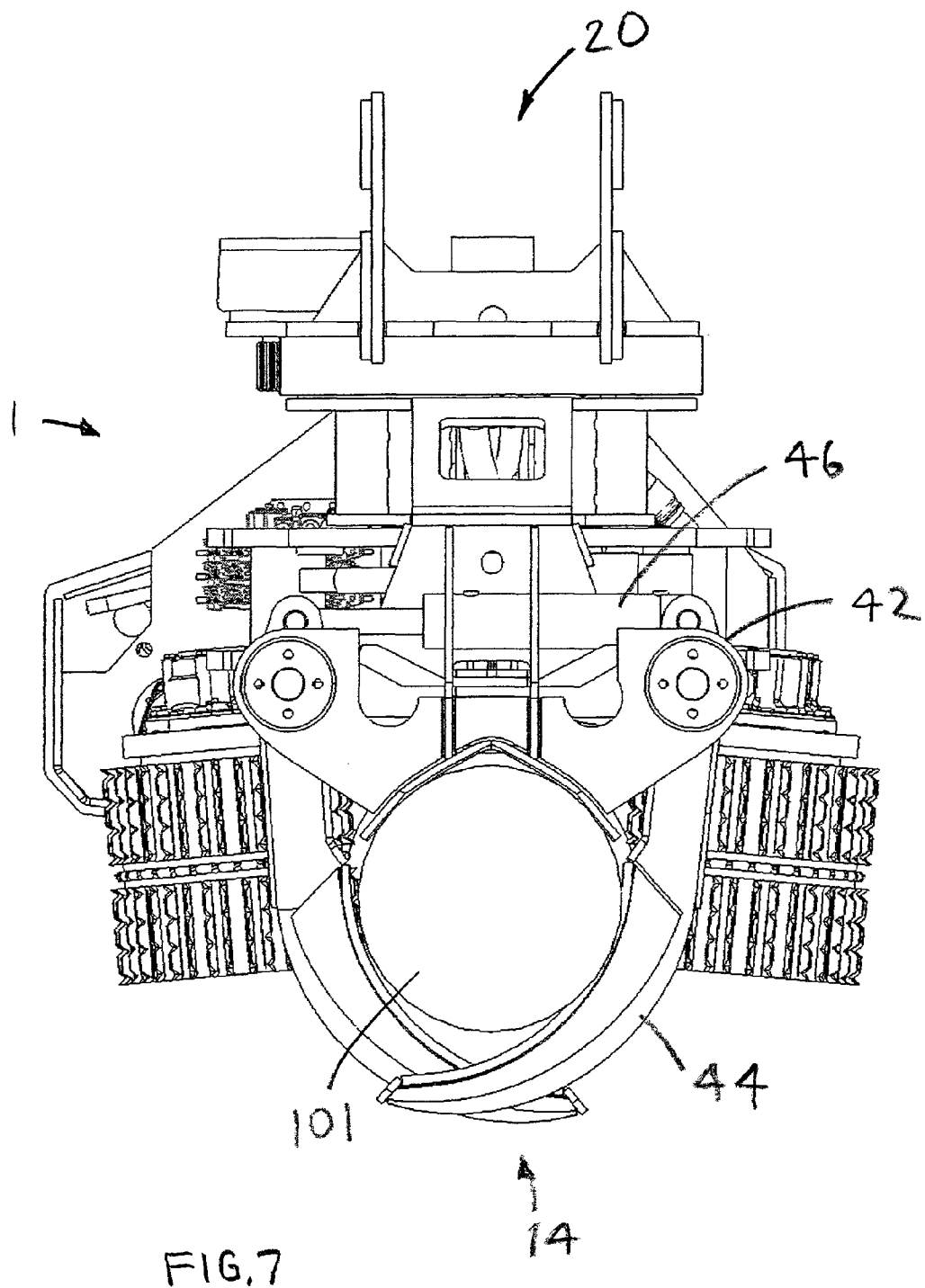
FIG. 7 is a top view of an improved four roller tree harvester head with a larger diameter tree retained in a pair of delimb arms in accordance with the present invention.

With reference to FIGS. 5c-5d, a hydraulic rotary union 37 may be mounted to the boom base plate 28. An electrical slip ring 39 is secured to an end of the hydraulic rotary union 37. The hydraulic rotary union 37 preferably includes a union body 41, a center rotational spool 43, a body support 47, a torque arm 49 and a plurality of hydraulic seals 51. A plurality of hydraulic ring channels 53 are formed in an inner perimeter of the union body 41. A plurality of hydraulic ports 57 are formed through the plurality of hydraulic ring channels 53. The center rotational spool 43 is rotatably retained in an inner perimeter of the union body 41. A plurality of rotational hydraulic porting 59 is formed in the center rotational spool 43 to communicate with the plurality of ring channels 53. A slewing ring bearing 61 is secured to the body support 47 with a plurality of fasteners 65, to the torque arm 49 and to the boom base plate 28.

The electrical slip ring 39 includes a ring body 67, a stationary brush support 69 and a plurality of brush contacts 71. An input wire 73 includes a plurality of input conductors 75, which are connected to the plurality of brush contacts 71. A wire bore 79 is formed through the center rotational spool 43 to receive a plurality of output conductors 81. The plurality of output conductors 81 are connected to electrical components of the improved four roller tree harvester head 1. The hydraulic rotary union 37 and the electrical slip ring 39 allow the tower frame 10 to be rotated an unlimited number of times relative to the tree harvester carrier boom 102.

Figure 9:
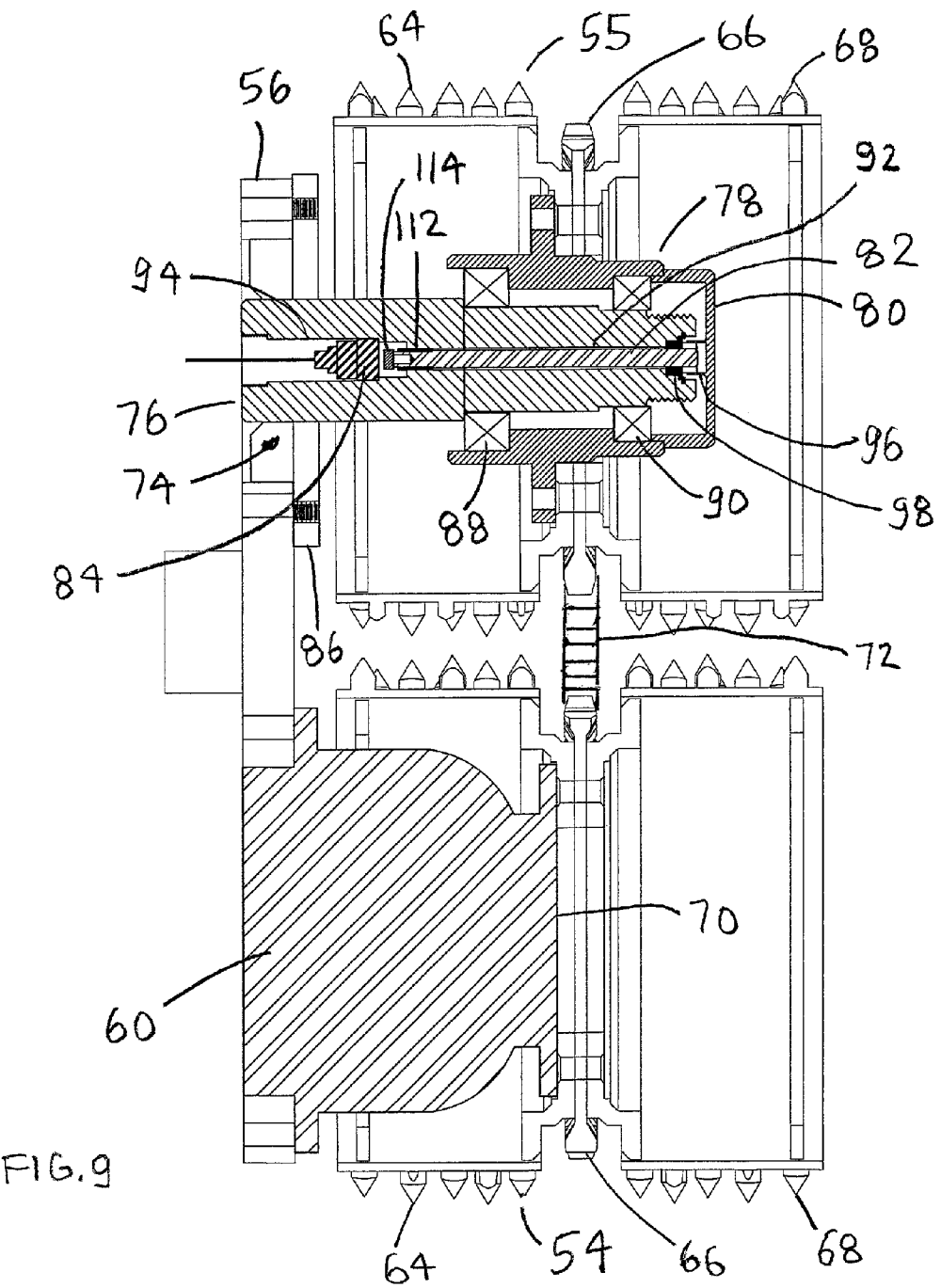
FIG. 9 is a cross sectional view of a walking beam of an improved four roller tree harvester head in accordance with the present invention.
Figure 10:
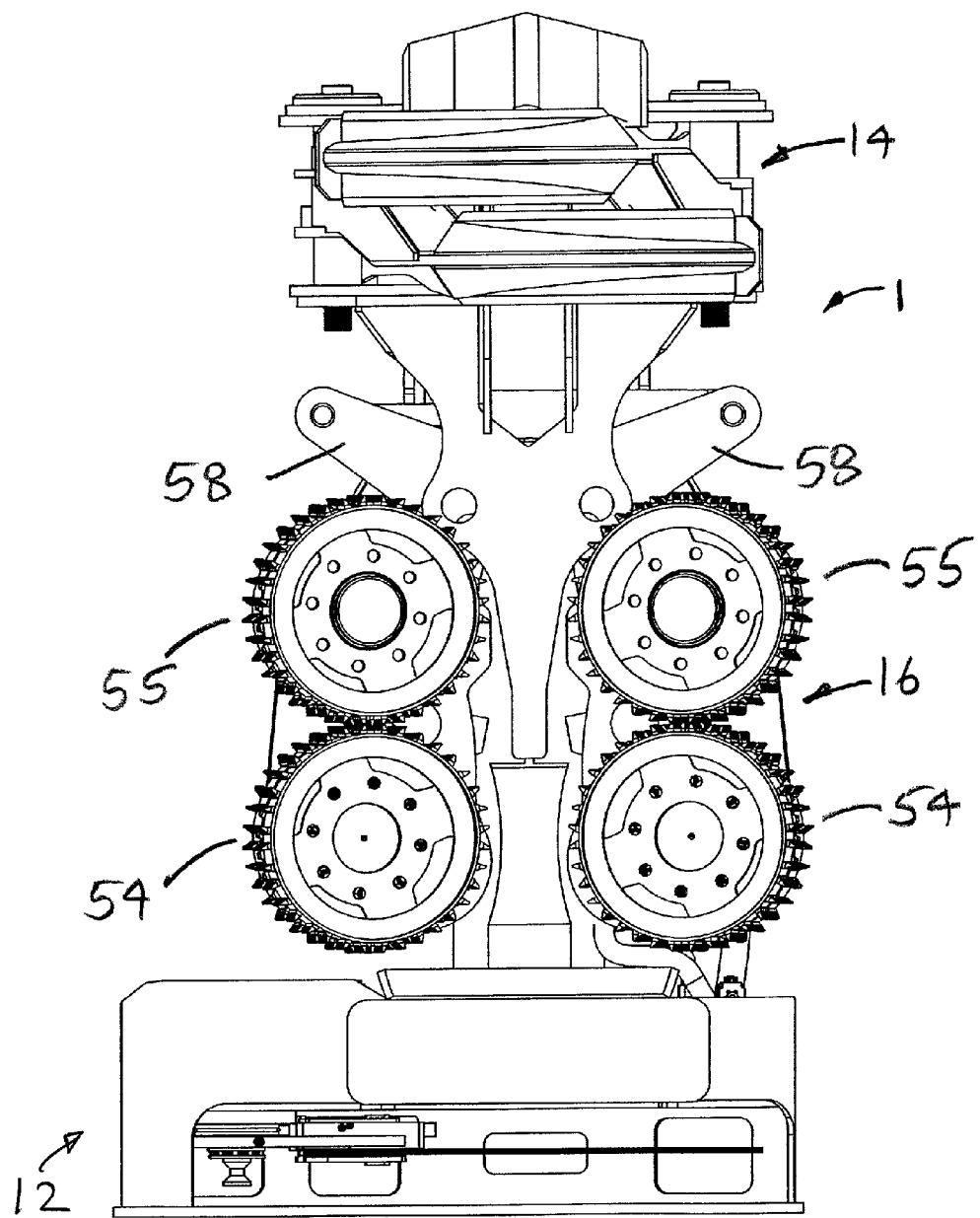
FIG. 10 is a front view of an improved four roller tree harvester head in accordance with the present invention.
Figure 10A:
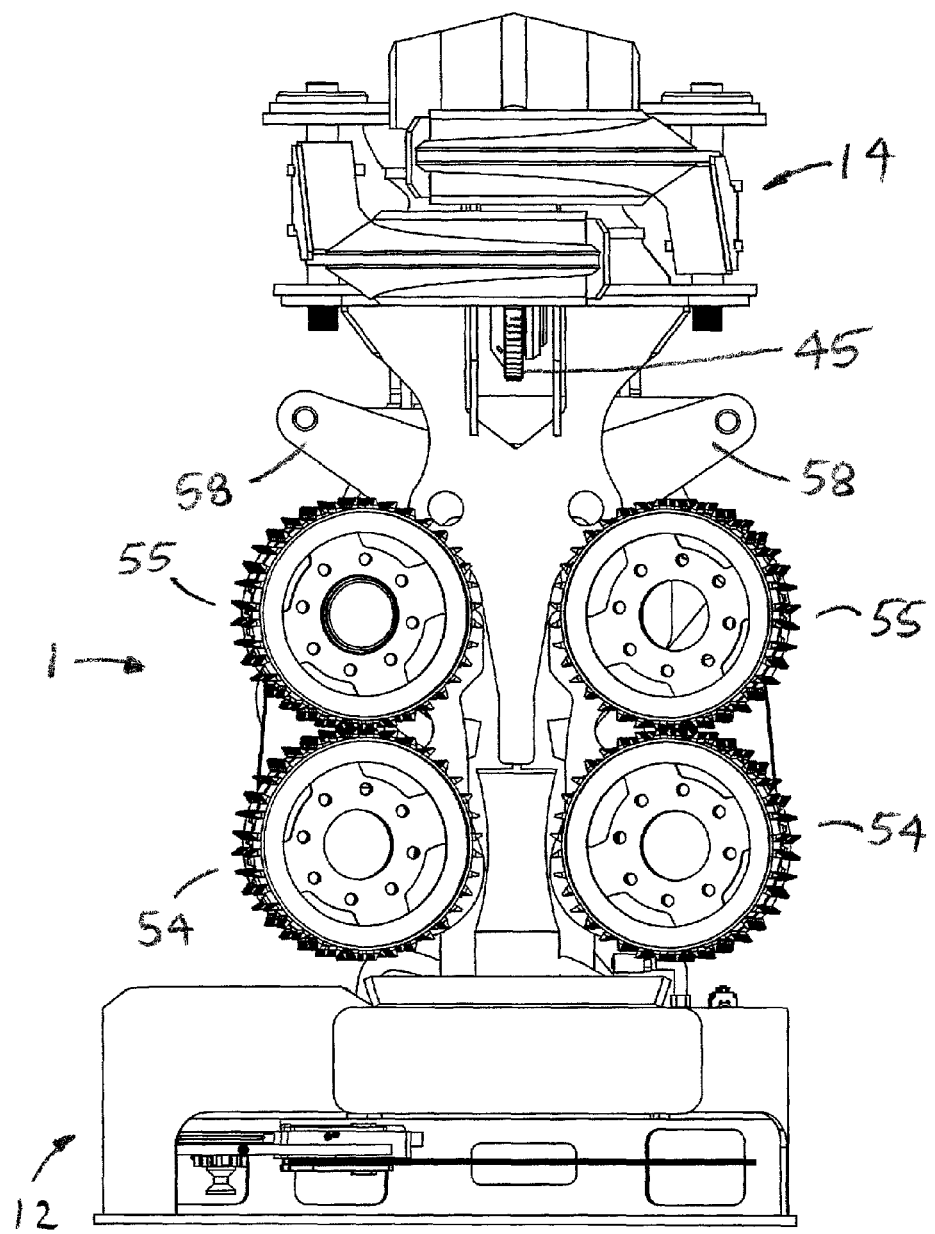
FIG. 10a is a front view of an improved four roller tree harvester head with an independent measurement wheel in accordance with the present invention.
Figure 11:
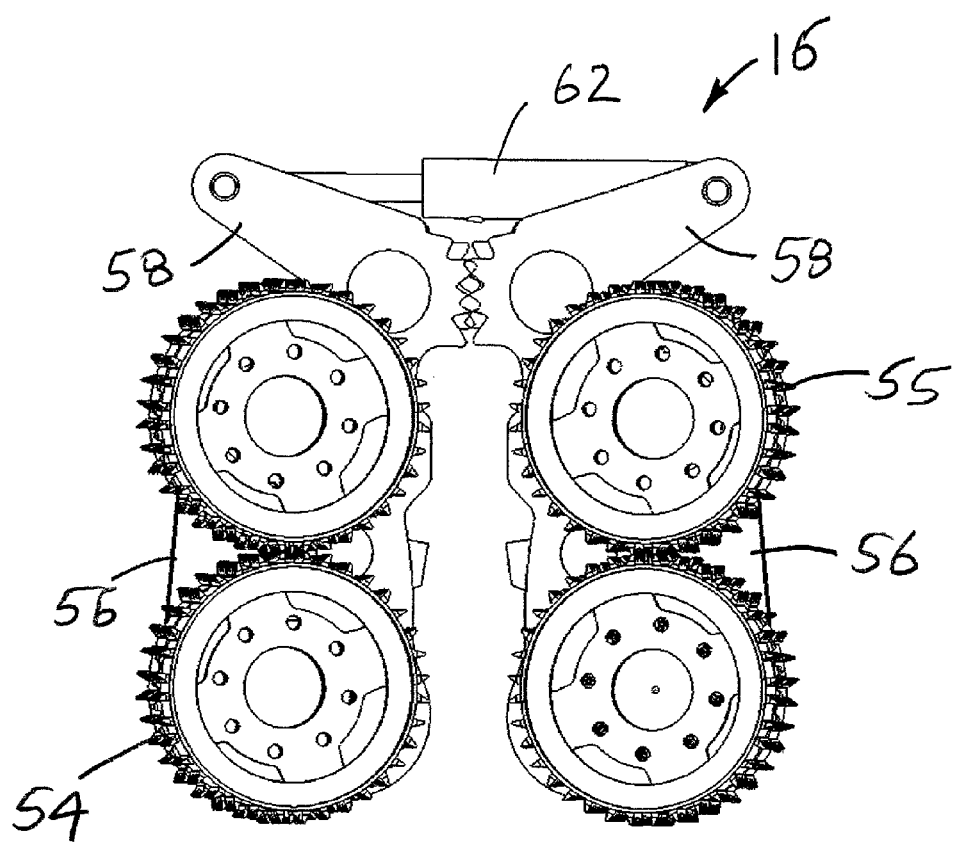
FIG. 11 is a front view of a four roller assembly of an improved four roller tree harvester head in accordance with the present invention.
Figure 12:
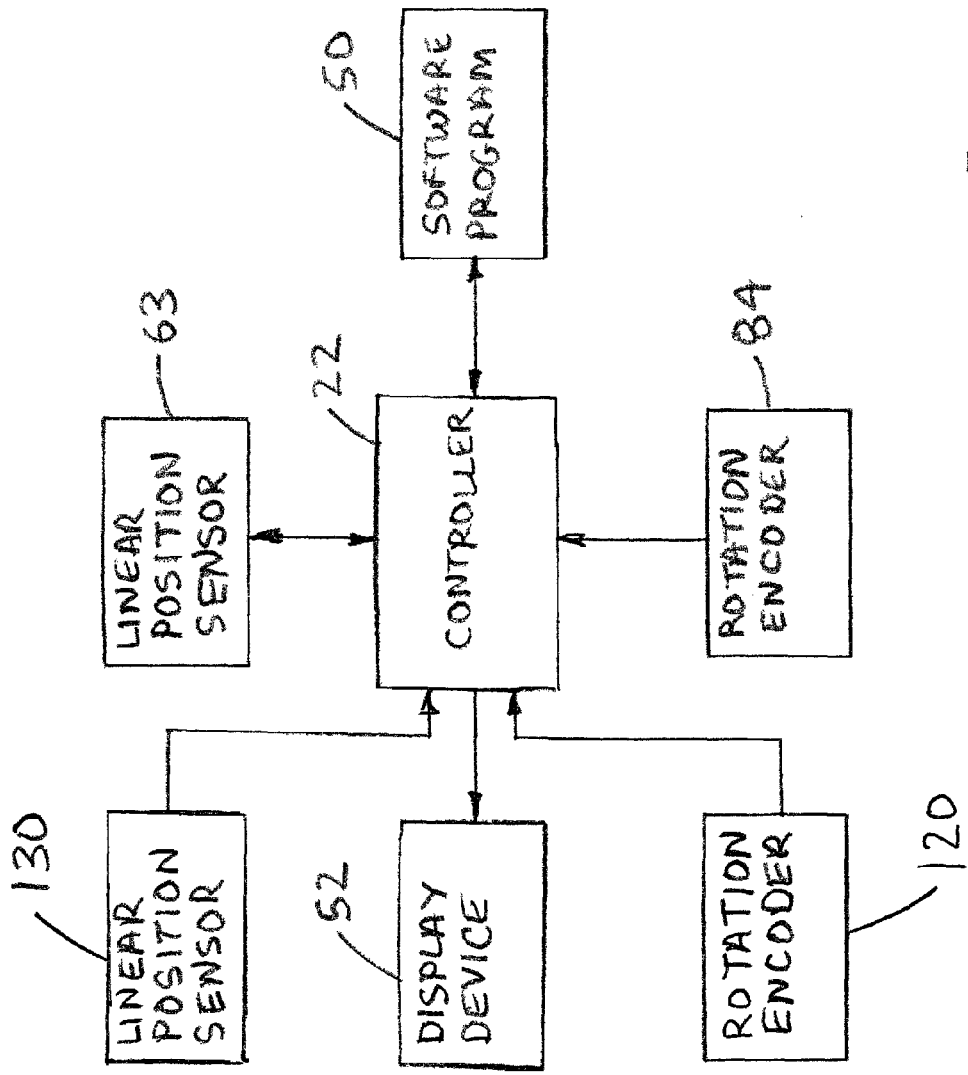
FIG. 12 is a schematic diagram of electrical components of an improved four roller tree harvester head in accordance with the present invention.
Figure 13:
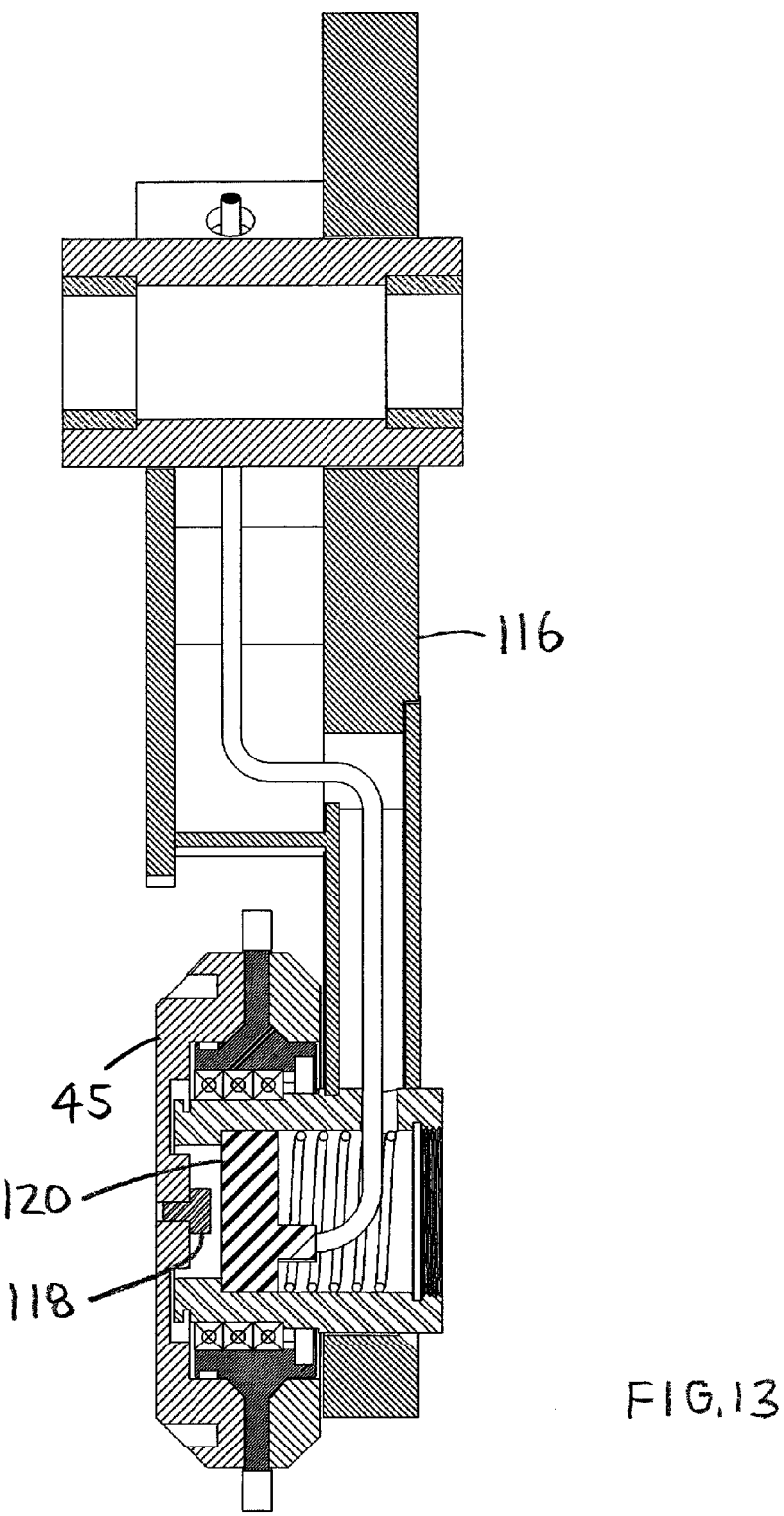
FIG. 13 is a cross sectional view of an independent measurement wheel rotatably retained on a pivot arm of an improved four roller tree harvester head in accordance with the present invention.

With reference to FIGS. 9-11, the four roller assembly 16 preferably includes four rollers 54, 55, a pair of walking beams 56, a pair of swing arms 58, motors 60 and an roller actuation cylinder 62. With reference to FIG. 12, the actuation cylinder includes a linear positioning sensor 63. The linear positioning sensor 63 provides a distance electrical signal about how far a shaft of the actuation cylinder 62 has moved. The distance electrical signal is feed to the electronic controller 22, which includes a software program 50 that calculates a diameter of the tree being harvested from the distance electrical signal. The electronic controller 22 sends the diameter of the tree to be displayed on a display device 52.

One end of each of the pair of swing arms 58 is pivotally engaged with an end of the roller actuation cylinder 62. The pair of swing arms 58 are also pivotally retained by the tower frame 10. The other end of the pair of swing arms 58 are pivotally engaged with the pair of walking beams 56. The rollers 54, 55 are retained on each walking beam 56. Each roller 54, 55 includes a first roller portion 64, a chain sprocket 66 and a second roller portion 68. The chain sprocket 66 is located between the first and second roller portions 64, 66. The drive roller 54 on each swing arm is driven by the motor 60 and attached to a drive boss 70 of the motor 60. The slave roller 55 is preferably driven by the chain sprocket 66 through a chain 72. The slave roller 55 is rotatably retained a roller shaft 74. The hydraulic valves 38 supply hydraulic fluid to the motors 25, 60, and the cylinders 46, 62.

The roller shaft 74 preferably includes a shaft portion 76 and a hub portion 78, a hub cap 80, a magnet shaft 82 and a rotation encoder 84. The rotation encoder 84 is preferably non-contacting and shaftless. The rotation encoder 84 is preferably used in both slave rollers 55, but could be used in only one slave roller 55. One end of the shaft portion 76 is pressed into a mounting plate 86. The mounting plate 86 is preferably attached to the walking beam 56 with fasteners, but other fastening devices or methods may also be used. The hub portion 78 is rotatably retained on the other end of the shaft portion 76 with a first hub bearing 88 and a second hub bearing 90. The hub portion 78 is preferably attached to the chain sprocket 66 with fasteners, but other fastening devices or methods may also be used. A shaft bore 92 is formed in the other end of the shaft portion 76. An encoder bore 94 is formed in the one end of the shaft portion 76. One end of the magnet shaft 82 is captured in a boss 96 of the hub portion 78. The magnet shaft 82 is rotatably retained in the shaft bore 92 with a first shaft bearing 98 and a second shaft bearing 112. A magnet 114 is attached into the other end of the magnet shaft 82. The rotation encoder 84 is pressed into the encoder bore 94. Rotation from the magnet shaft 82 provides a magnetic output to the rotation encoder 84 about many rotations or what fraction of a rotation of the slave roller 55 has been made. The rotation encoder 84 provides an electrical signal to the electronic controller 22. The electronic controller 22 includes the software program 50 that translates the rotation of the slave roller 55 to find a length of the section of the tree 100, 101 being harvested.

With reference to FIGS. 1a, 5a, 10a and 13, an independent measurement wheel 45 is rotatably retained on one end of a pivot arm 116. The other end of the pivot arm is pivotally retained on the delimb head box 14. A magnet 118 is pressed into the independent measurement wheel 45 adjacent a rotation encoder 120. The rotation encoder 120 is preferably a non-contact shaftless rotation encoder. A signal from the rotation encoder 120 is feed to the electronic controller 22. Rotation of the independent measurement wheel 45 by the travel of the tree 100, 101 through the roller assembly 16 provides a measurement of a length of the tree 100, 101 being processed.

With reference to FIGS. 14-15, the independent measurement wheel 45 is kept is in contact with the tree 100, 101 through a tensioning device w. The tensioning device 122 includes a pivot rod 124, a slide post 126 and a compression spring 128. One end of the pivot rod 124 is pivotally retained on the pivot arm 116 and the other end of the pivot rod 124 is slidably engaged with the pivot post 126. The compression spring 128 is retained on the pivot rod 124 to bias the pivot arm 116 away from the delimb head box 14 and against the tree 100, 101. A linear magnet 128 is secured to the other end of the pivot rod 124. A linear position sensor 130 is secured to the pivot post 126, below the pivot rod 124. The linear position sensor 130 and the linear magnet 128 provide constant monitoring of the position of the independent measurement wheel 45 to the electronic controller 22, such that the electronic controller 22 varies the position of the delimb arms 44 to keep the tree 100, 101 pressed against the independent measurement wheel 45.

However, any improvement to the four roller tree harvester head 1 may also be applied to a tree harvester head having only two rollers.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. An improved tree harvester head for attachment to a tree harvester boom, the tree harvester boom includes two parallel pivotal boom connections, comprising:
    a tower frame;
    a boom bracket for mounting to the boom of the tree harvester, said boom bracket includes two parallel pivotal bracket connections which are pivotally engaged with the two parallel pivotal boom connections of the boom of the tree harvester;
    a hydraulic rotary union includes a wire bore;
    a slewing ring is attached to said tower frame and said boom bracket;
    an electrical slip ring is attached to said hydraulic rotary union, an input wire is attached to said electrical slip ring, an output wire extends from said electrical slip ring, said output wire extends through said wire bore, said hydraulic rotary union is attached to said boom bracket;
    at least one slewing ring motor for driving said slewing ring, wherein said hydraulic rotary union and said electrical slip ring allows said tower frame to be rotated an unlimited number of times relative to the boom of the tree harvester; and
    a roller assembly for moving a portion of a tree in an axially motion is attached to said tower frame.

2. The improved tree harvester head of claim 1, further comprising:
    at least two hydraulic hoses are attached to said rotary union.

3. The improved tree harvester head of claim 1, further comprising:
    a delimb head box is attached to a top of said tower frame.

4. The improved tree harvester head of claim 1, further comprising:

said boom bracket is sized to receive and pivotally retain a boom of a tree harvester.

5. The improved tree harvester head of claim 1, further comprising:
a saw box is mounted to a bottom of said tower frame.

6. The improved tree harvester head of claim 1, further comprising:
at least one hydraulic control valve is retained by said roller tree harvester head, said at least one hydraulic control valve operates functions of said improved roller tree harvester head.

7. An improved tree harvester head for attachment to a tree harvester boom, the tree harvester boom includes two parallel pivotal boom connections, comprising:
a tower frame;
a boom bracket for mounting to the boom of the tree harvester, said boom bracket includes two parallel pivotal bracket connections which are pivotally engaged with the two parallel pivotal boom connections of the boom of the tree harvester;
a hydraulic rotary union includes a wire bore;
a slewing ring includes an inner ring and an outer ring, said slewing ring is attached to said tower frame and said boom bracket;
an electrical slip ring is attached to said hydraulic rotary union, an input wire is attached to said electrical slip ring, an output wire extends from said electrical slip ring, said output wire extends through said wire bore, said hydraulic rotary union is attached to said boom bracket;
at least one slewing ring motor for directly driving an outside perimeter of said outer slewing ring with respect to said inner ring, wherein said hydraulic rotary union and said electrical slip ring allows said tower frame to be rotated an unlimited number of times relative to the boom of the tree harvester; and
a roller assembly for moving a portion of a tree in an axially motion is attached to said tower frame.

8. The improved roller tree harvester head of claim 7, further comprising:
at least two hydraulic hoses are attached to said rotary union.

9. The improved roller tree harvester head of claim 7, further comprising:
a delimb head box is attached to a top of said tower frame.

10. The improved roller tree harvester head of claim 7, further comprising:
said boom bracket is sized to receive and pivotally retain a boom of a tree harvester.

11. The improved roller tree harvester head of claim 7, further comprising:
a saw box is mounted to a bottom of said tower frame.

12. The improved roller tree harvester head of claim 7, further comprising:
said hydraulic control valves operate functions of said roller tree harvester head through signals received by said electrical slip ring.

13. An improved tree harvester head for attachment to a tree harvester boom, the tree harvester boom includes two parallel pivotal boom connections, comprising:
a tower frame;
a boom bracket for mounting to the boom of the tree harvester, said boom bracket includes two parallel pivotal bracket connections which are pivotally engaged with the two parallel pivotal boom connections of the boom of the tree harvester;
a hydraulic rotary union includes a wire bore;
a slewing ring includes an inner ring and an outer ring, said slewing ring is attached to said tower frame and said boom bracket;
an electrical slip ring is attached to said hydraulic rotary union, an input wire is attached to said electrical slip ring, an output wire extends from said electrical slip ring, said output wire extends through said wire bore, said hydraulic rotary union is attached to said boom bracket;
at least one hydraulic control valve is retained on said tree harvester head, at least one hydraulic hose is connected to said at least one hydraulic control valve;
at least one slewing ring motor for directly driving an outside perimeter of said outer slewing ring with respect to said Inner ring, wherein said hydraulic rotary union and said electrical slip ring allows said tower frame to be rotated an unlimited number of times relative to the boom of the tree harvester; and
at least one of a two roller assembly and a four roller assembly for moving a portion of a tree in an axially motion is attached to said tower frame.

14. The improved tree harvester head of claim 13, further comprising:
at least two hydraulic hoses are attached to said rotary union.

15. The improved tree harvester head of claim 13, further comprising:
a delimb head box is attached to a top of said tower frame.

16. The improved tree harvester head of claim 13, further comprising:
said boom bracket is sized to receive and pivotally retain a boom of a tree harvester.

17. The improved tree harvester head of claim 13, further comprising:
a saw box is mounted to a bottom of said tower frame.

18. The improved tree harvester head of claim 13, further comprising:
at least one hydraulic control valve is retained by said roller tree harvester head, said at least one hydraulic control valve operates functions of said improved roller tree harvester head.

* * * * *